June 18, 1935.  J. L. ADAMS, JR  2,005,329
METHOD AND APPARATUS FOR WELDING
Filed Oct. 8, 1930  11 Sheets-Sheet 1
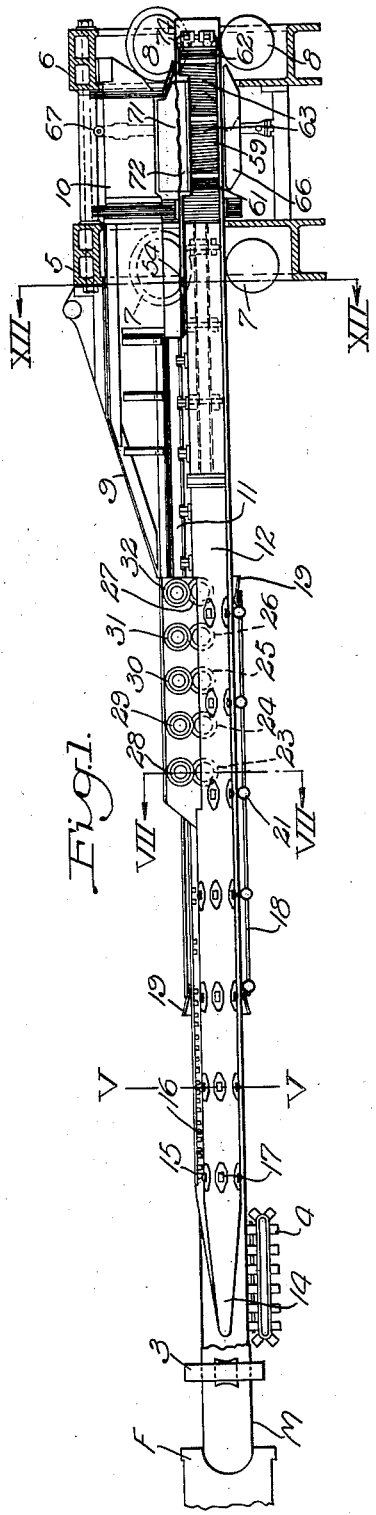
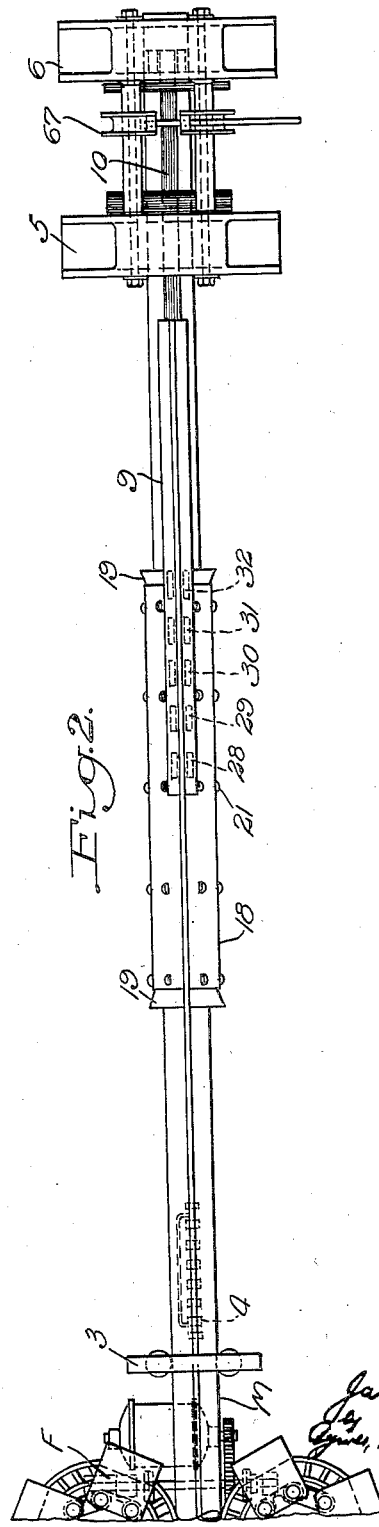
INVENTOR

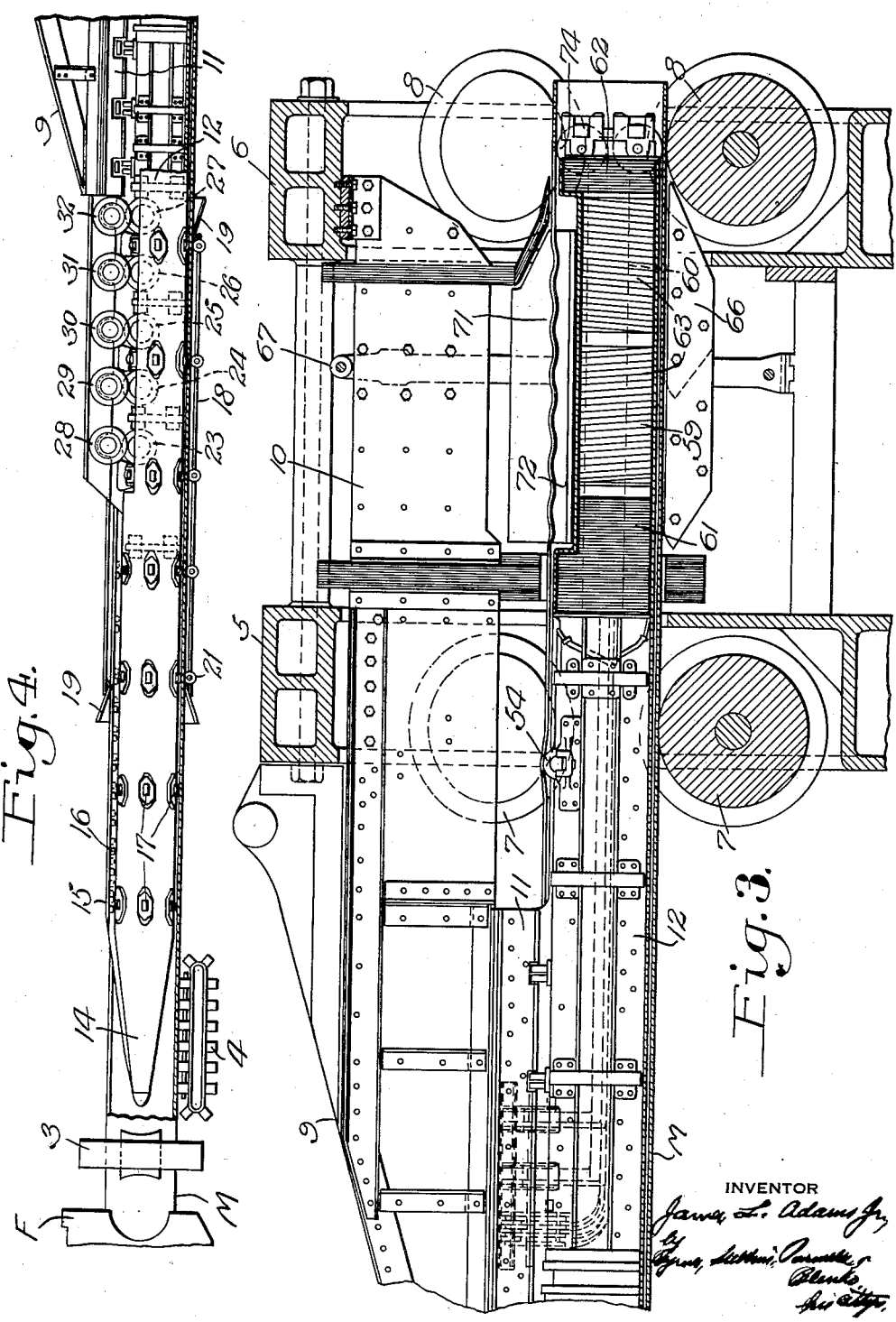

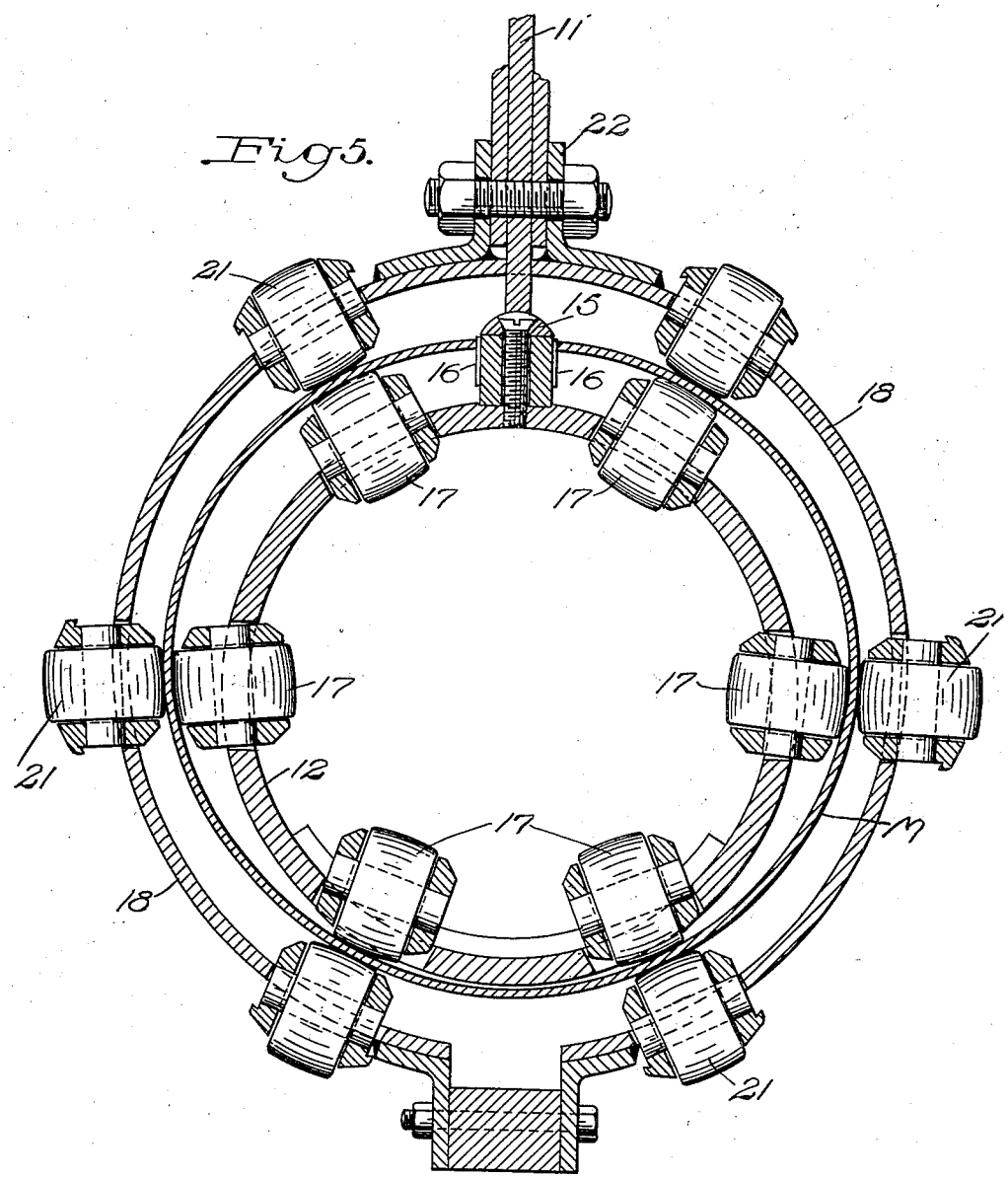

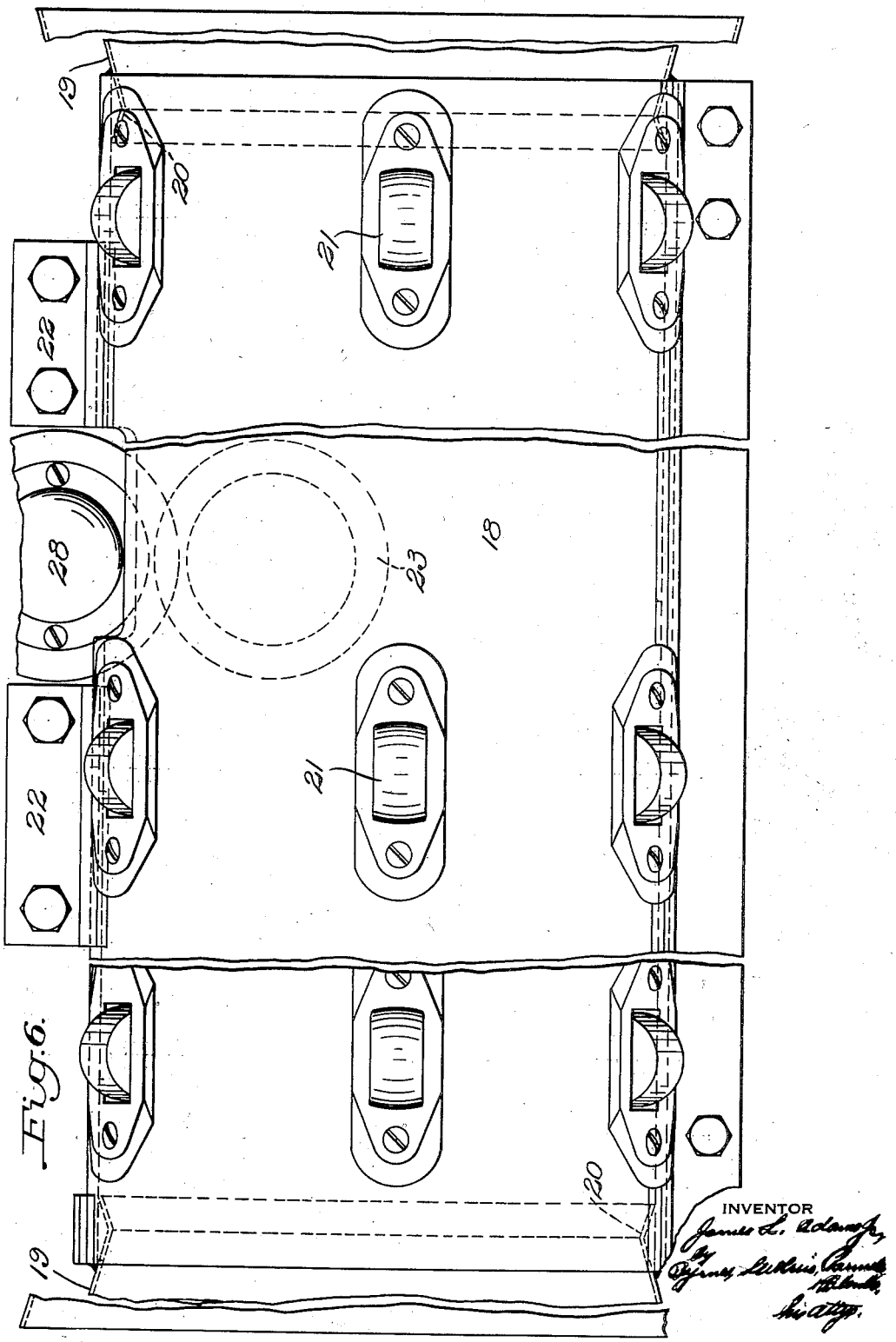

June 18, 1935.  J. L. ADAMS, JR  2,005,329
METHOD AND APPARATUS FOR WELDING
Filed Oct. 8, 1930  11 Sheets-Sheet 5
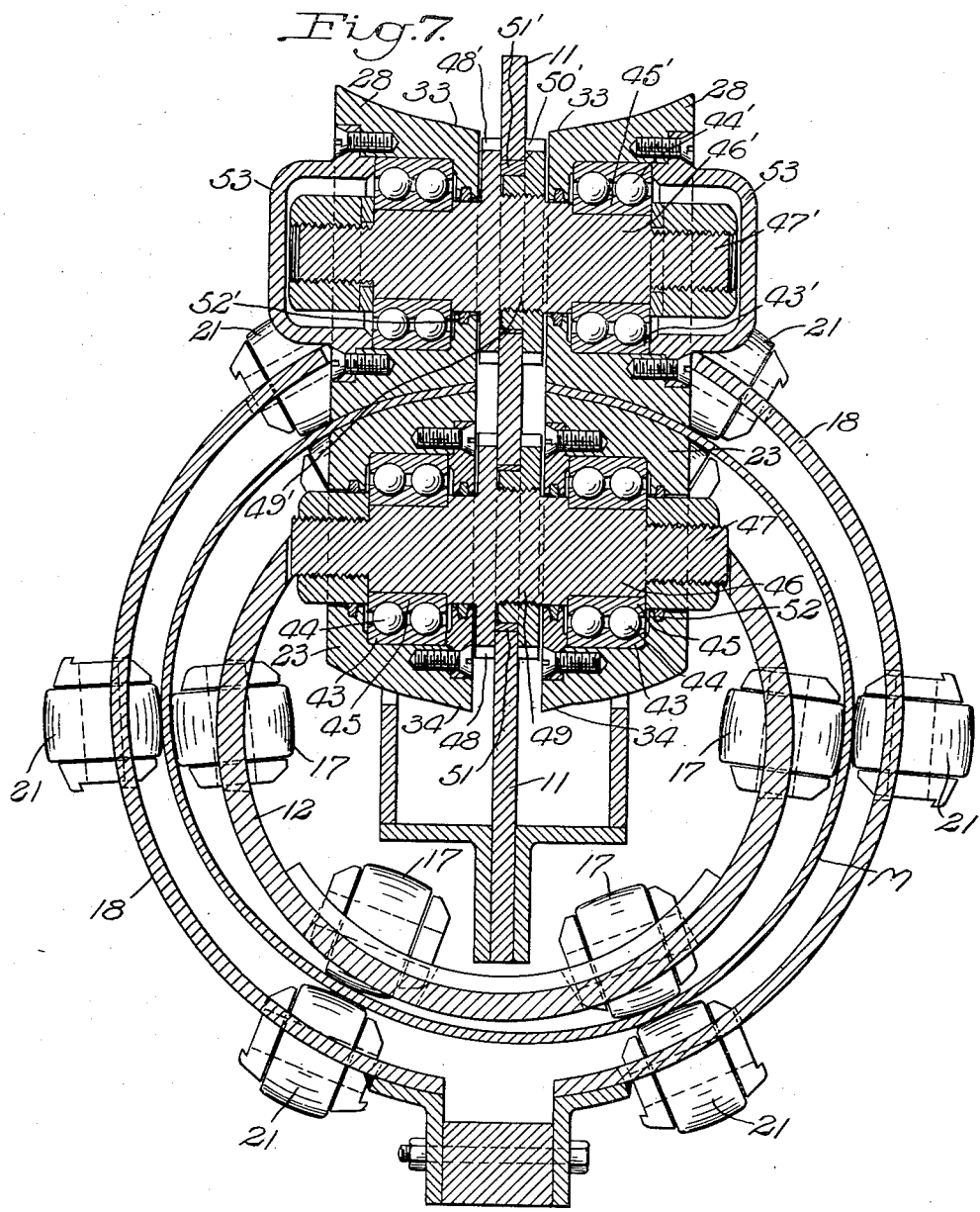
INVENTOR June 18, 1935. J. L. ADAMS, JR 2,005,329
METHOD AND APPARATUS FOR WELDING
Filed Oct. 8, 1930  11 Sheets-Sheet 6
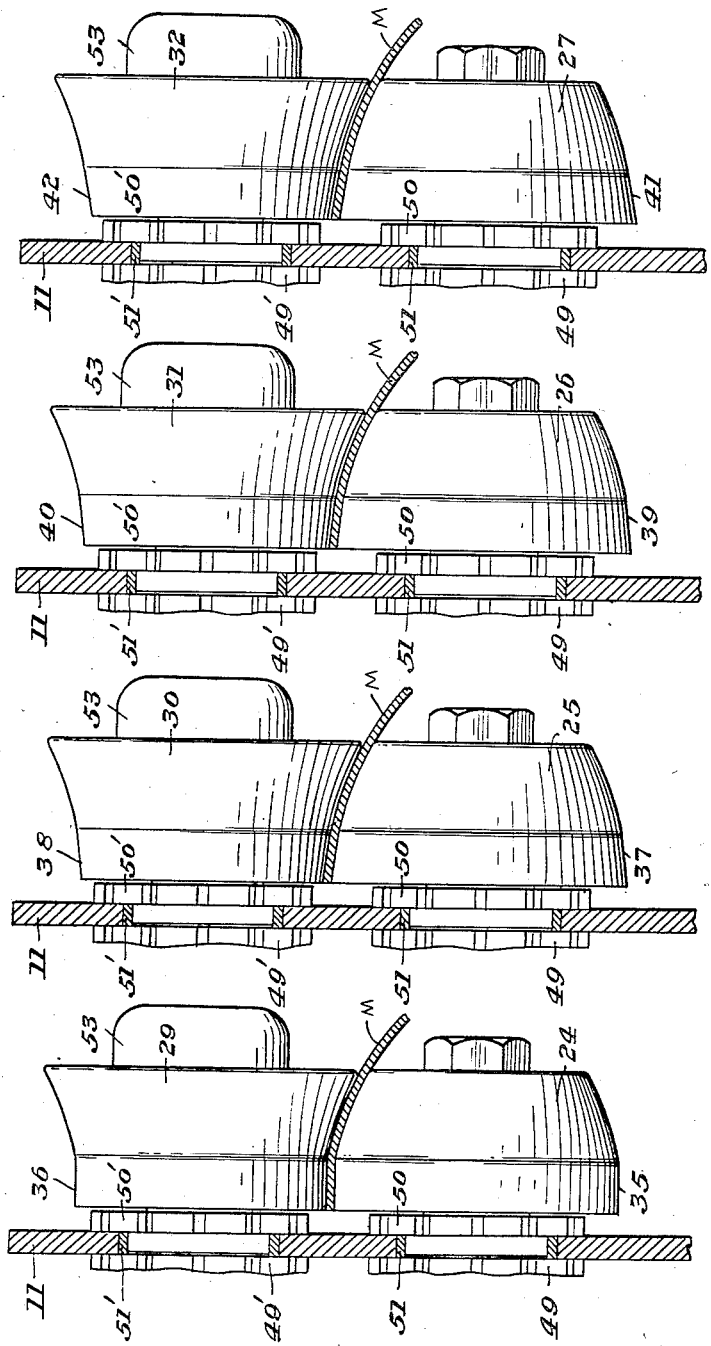

June 18, 1935.  J. L. ADAMS, JR  2,005,329
METHOD AND APPARATUS FOR WELDING
Filed Oct. 8, 1930   11 Sheets-Sheet 7

INVENTOR
James L. Adams Jr.

June 18, 1935. J. L. ADAMS, JR 2,005,329
METHOD AND APPARATUS FOR WELDING
Filed Oct. 8, 1930 11 Sheets-Sheet 9

INVENTOR
James L. Adams Jr.

June 18, 1935. J. L. ADAMS, JR 2,005,329
METHOD AND APPARATUS FOR WELDING
Filed Oct. 8, 1930 11 Sheets-Sheet 10
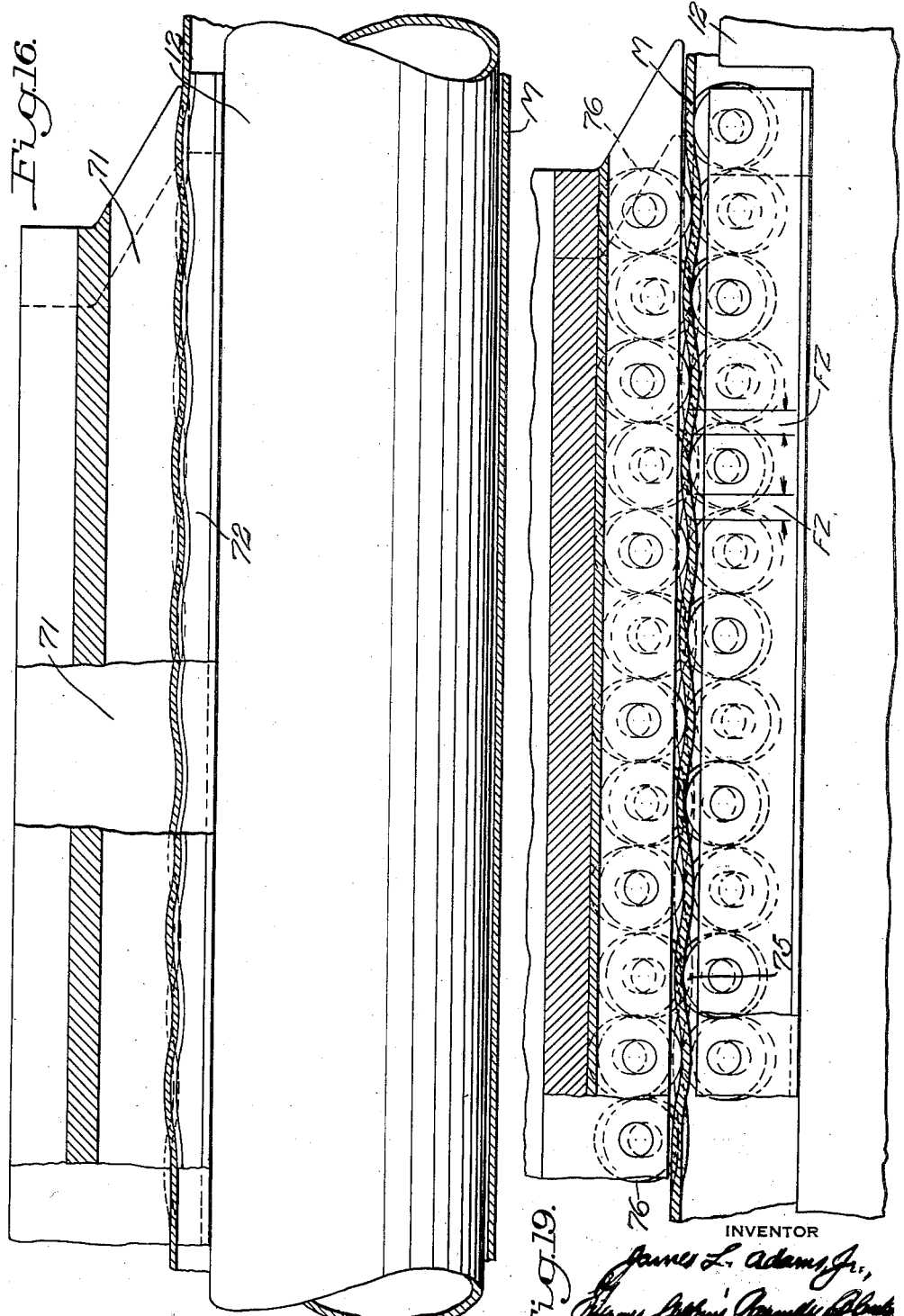
INVENTOR

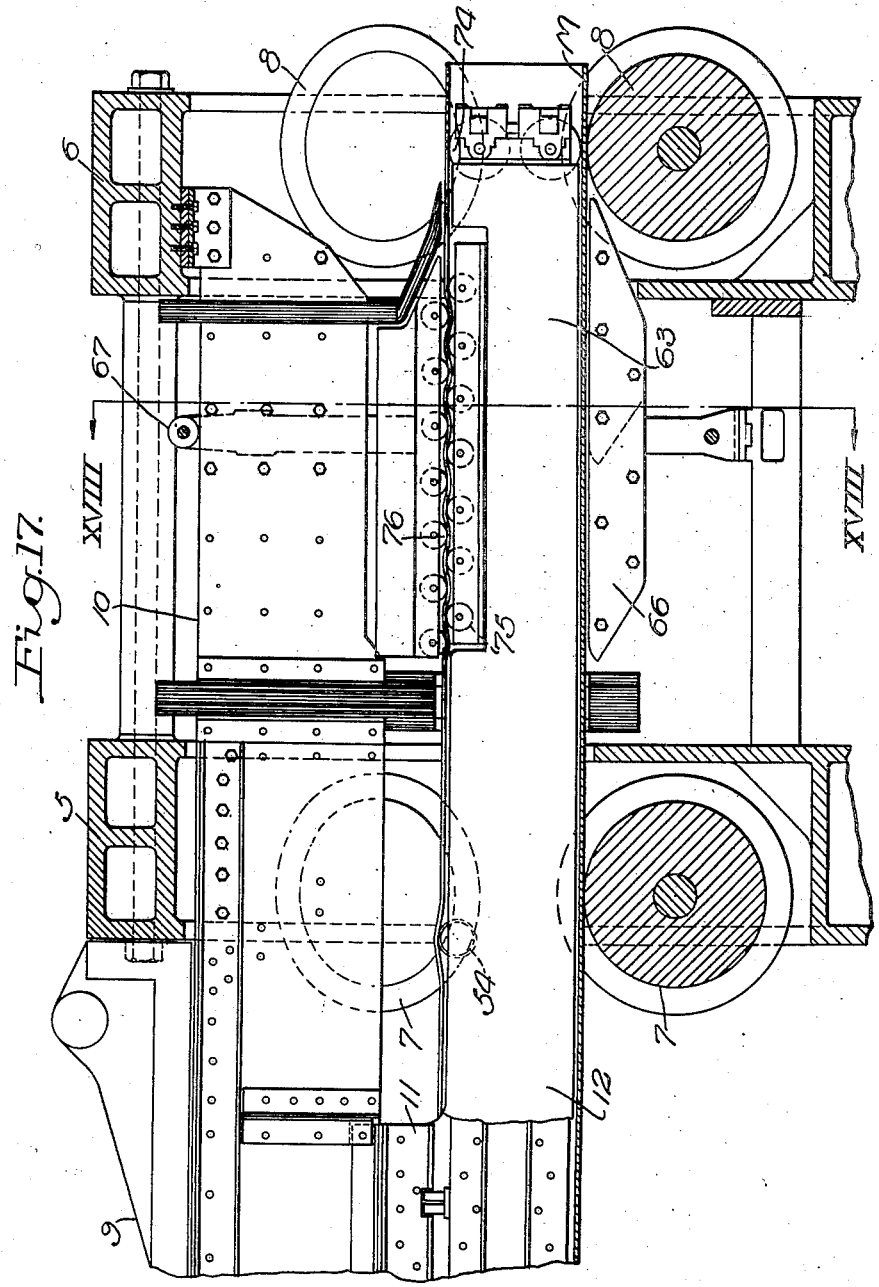

Patented June 18, 1935

2,005,329

UNITED STATES PATENT OFFICE 2,005,329

METHOD AND APPARATUS FOR WELDING

James L. Adams, Jr., Youngstown, Ohio

Application October 8, 1930, Serial No. 487,194

26 Claims. (Cl. 219—6)

The present invention relates broadly to the art of electric welding, and more particularly to an electric welding apparatus and method of the so-called induction type, although the utility of the invention is not limited to the particular welding system employed.

With induction welding apparatus as utilized for the welding of tubular or substantially tubular material, considerable difficulty has been experienced in maintaining the edges of the material in such relative position as to effect an accurately aligned weld. This difficulty increases proportionately as the material being welded decreases in thickness.

Induction welders of the character heretofore provided have operated either on the principle of flash welding, resistance welding, or a combination of the two. With the flash type of operation, the flash produced for effecting the heating of the material to, or substantially to, the welding temperature, has a tendency to unevenly burn the edges of the material in case the edge faces are not exactly square or normal to the material surfaces or flush one with the other. With resistance welding, or with a combination of flash and resistance welding, the same difficulties are encountered. The pressure subsequently applied to the material to effect the weld is such as to cause the edges, if uneven or not flush one with the other, to ride, or overlap, thereby resulting in an imperfect or non-uniform seam. This tendency is amplified by reason of the fact that the projecting or uncovered portions of the opposed faces, that is, the proportions not opposed by the other edge face, do not heat up as much as the other portions which are opposed and in the zone of which the heating effect is concentrated. Hence, such non opposing portions remain relatively firm and hard, so that when the welding pressure is applied they act like chisels, edging their way past the relatively softer portions, tending to exaggerate the lapping tendency.

The present invention has for one of its objects the provision of an improved method and apparatus by means of which such difficulties heretofore encountered in welding apparatus of the general character referred to are substantially obviated. The improved results characteristic of the present invention are obtained, in part at least, by the provision of means for pretreating the edges of the material so as to cause the same, during the subsequent heating and welding operations, to occupy a position substantially square or normal to the material surfaces and flush one with the other. The invention also contemplates the provision of means effective preferably in the heating zone, where flash type welding is resorted to, for insuring such a relationship of the edges that the flash will produce a substantially square burning off of the edges. In accordance with a preferred embodiment of my invention such a result is obtained by the use of means effective for weaving or alternately depressing and elevating one or both of the edges slightly whereby they are caused at successive intervals to cross each other at an angle in a substantially continuous series of sinuous flexures. In the drawings these flexures have been slightly exaggerated for sake of clearness.

While either the pre-treating operation before referred to, or the edge weaving operation, may be utilized independently of each other, I have found that the most satisfactory results are obtained where the two means are both used in effecting the desired heating and welding operations. In general, the pre-treating referred to will carry the surface fibres beyond the elastic limit, while the second flexing operation occurring during heating will not.

In accordance with the embodiment of the invention hereinafter described, a substantially tubular preformed material after having been subjected to an edge pretreating operation is preferably sized cold and accurately positioned by means of a suitable confining system usually in the form of crushing rolls, prior to the actual heating and welding steps. In accordance with the present invention I preferably provide means of insuring such a relationship of the pressure system and the tubular material as to insure the desired crushing and positioning of the adjacent edges. Such an operation is conveniently obtained by the provision of a deflecting means in the form of a roller effective in opposition to the crushing system and slightly in advance thereof with respect to the movement of the material, whereby the material, particularly as to the edges thereof, is deflected out of its normal plane of travel and into such a position that the two opposed edges cannot enter the crushing zone in offset relation. This deflecting roller slightly opens the seam and causes the outer surfaces of both edges to ride the crusher rolls as such edges approach the crushing zone. This effectively maintains the desired alignment of the edges while the crushing is done, the set given the material by the crushing operation then tending to maintain such alignment. By reason of this operation the edges are held flush one with the other and are crushed or set to this position during the action of the crushing system. In this manner the edges are disposed in the desired position for subsequent heating and welding, and undue deformation and overlapping of the edges prevented.

The invention further contemplates an apparatus including means for sizing the substantially tubular material ready for the welding operation, and for accurately guiding the preformed material into the welding apparatus, including the pretreating, crushing, sizing and other units, in such position that operations of the character referred to may be progressively performed thereon.

In the accompanying drawings I have illustrated more or less diagrammatically certain preferred embodiments of the present invention. In the drawings:

Figure 1 is a diagrammatic side elevational view, partly in section and partly broken away, of one form of apparatus constructed in accordance with the present invention;

Figure 2 is a top plan view of the apparatus illustrated in Figure 1;

Figure 3 is a view similar to Figure 1 but on an enlarged scale, illustrating the right hand end portion of the apparatus of Figure 1 in greater detail;

Figure 4 is a view similar to Figure 3 but illustrating the left hand portion of the apparatus;

Figure 5 is a transverse sectional view, on an enlarged scale, on the line V—V of Figure 1;

Figure 6 is a side elevational view, partly broken away, illustrating a portion of the guiding means and edge pretreating means;

Figure 7 is a transverse sectional view, on an enlarged scale, on the line VII—VII of Figure 1;

Figures 8, 9, 10 and 11 are detail views partly in elevation and partly in section illustrating successive stages during the pre-treating or edge leveling operation;

Figure 16 is a diagrammatic view illustrating the operation of the edge weaving means of Figures 14 and 15;

Figure 17 is a side elevational view of a modified form of edge weaving means;

Figure 19 is a view similar to Figure 16, illustrating in diagram the operation of the edge weaving means of Figures 17 and 18.

Figure 12:
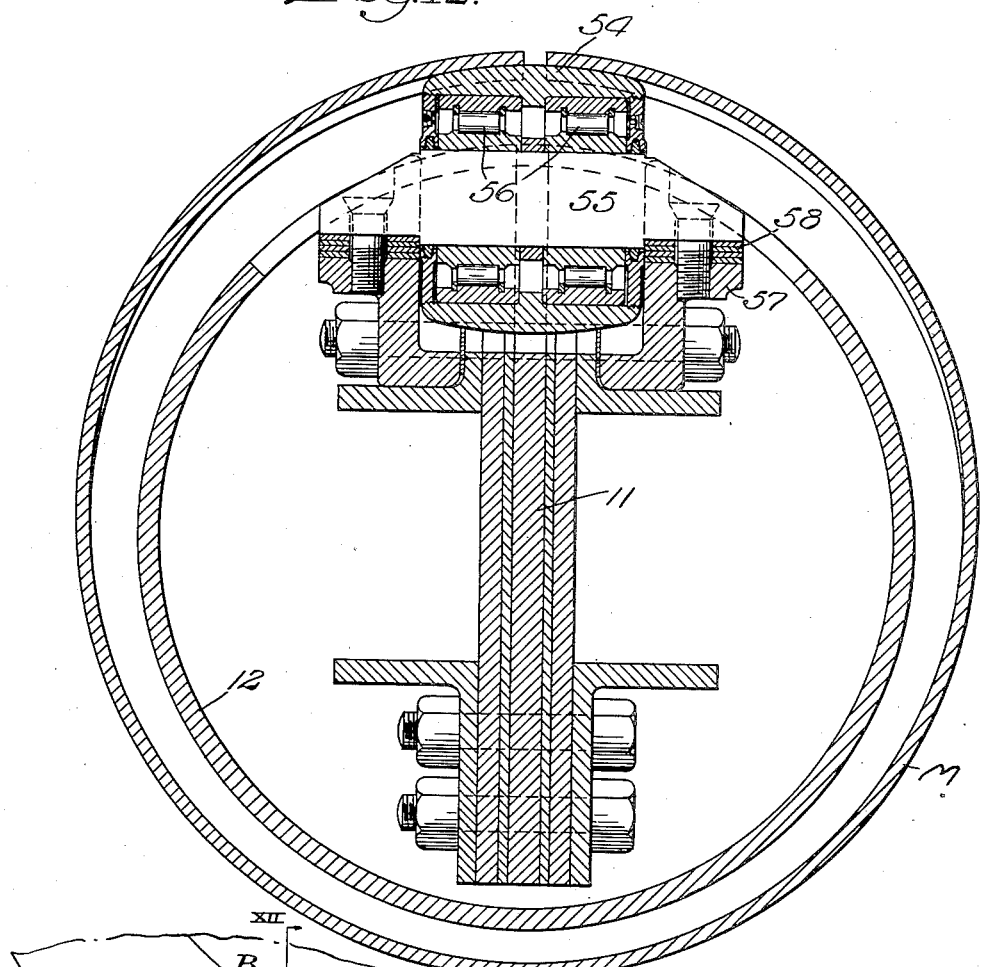
Figure 12 is a detail sectional view, on an enlarged scale, along the line XII—XII of Figure 1, and in full scale along the corresponding section line of Figure 13.

In carrying out the present invention, there may be provided suitable welding and suitable forming means of a wide variety of different types. In illustrating the present invention I have shown a forming means of the general character disclosed and claimed in my co-pending application Serial No. 365,323, filed May 23, 1929, and have shown welding apparatus of the general character disclosed and claimed in my co-pending application Serial No. 453,888, filed May 20, 1930. The general details of such mechanisms, except insofar as they are important in the carrying out of the present invention, are not generally essential thereto and are therefore described only in sufficient detail to give a full understanding of the present invention.

In Figures 1 and 2 of the drawings I have illustrated diagrammatically a suitable form of apparatus for carrying out the present invention. In these figures there is shown a forming mechanism F, comprising a series of opposed traveling dies of such construction and contour as to effect the forming up of a substantially flat piece of material in the form of a strip or plate into a substantially tubular shape with the edges thereof in adjacent, opposed and slightly spaced relationship ready for the formation of the desired seam or weld. It will be understood that while I have illustrated the forming mechanism of the traveling die type, the pre-forming of the material may be effected in any other desired manner as, for example, by means of suitable forming-up rolls or by means of presses, as understood by those skilled in the art.

The preformed material M upon leaving the forming means may be passed directly to the welding apparatus or may be passed through a suitable auxiliary sizing means herein illustrated as comprising a roll stand 3, by means of which the preformed material may be given a partial sizing operation and the edges thereof spaced or brought together the desired amount before delivery to the welding apparatus.

Upon leaving such sizing and forming means, where it is provided, the material may either pass directly to the welding apparatus, or to suitable feeding means 4 by which the desired longitudinal travel is effected. This feeding means may be either of the magnetic or the mechanical type, although the former is preferred for the reasons that it enables the material to be moved in either direction at the will of the operator, and further makes possible the handling of indiscriminate lengths.

The welding apparatus herein illustrated comprises two main roller stands 5 and 6 which will hereinafter be referred to as the crushing roll stand and the welding roll stand respectively. Mounted within the crushing roll stand is a series of crushing rolls 7 of such number and so positioned as to effectively engage the preformed tubular material and finally size the same preparatory to the welding operation. The welding stand in like manner contains a series of welding rolls 8. One or more of the rolls of either or both stands may be driven in any desired manner, constituting no part of the present invention.

Projecting rearwardly from the crushing roll stand is a suitable supporting means 9 herein illustrated as comprising an extension of the laminated yoke 10 and carrying a center plate 11 of such thickness as to permit the passage on opposite sides thereof of the spaced edges of the substantially tubular preformed material. Supported by the center plate 11 is a "torpedo" structure 12 constituting at its left hand end, as viewed in Figure 4, a portion of the guiding and edge pre-treating means hereinafter described in detail, and at its right hand end a portion of the heating and welding means also described in detail hereinafter.

The left hand end of the torpedo with its associated parts is illustrated in greater detail in Figure 4 of the drawings. As shown in Figure 4, and as illustrated diagrammatically in Figures 1 and 2, the left hand end of the torpedo comprises a tapered or conical nose-piece 14 so disposed as to initially receive and guide the preformed material into the welding apparatus. In case the apparatus is being utilized for the formation of a top seam, it will be provided on its upper edge with a substantially radially extending projection 15 in which is mounted a series of edge guiding rollers 16. In case, however, the apparatus is being utilized for the production of a bottom seam or weld, the position of the plate 15 and of other correspondingly positioned parts in the apparatus adapted to cooperate more particularly with the edge portions of the material will be located below the torpedo rather than above same. In like manner where the apparatus is utilized for the production of a side seam, the parts will be properly positioned to cooperate with the so positioned edge portions of the material.

In addition to the edge guiding rollers 16, the torpedo extension is also provided with a series of guiding rollers 17 effective at spaced points around the inside of the preformed material. The position of these rollers is illustrated in greater detail in Figure 5, from which figure it will be apparent that the rollers may be offset from a truly radial position if desired, by an amount sufficient to compensate for the actual non-circularity of the preformed material, and to such an extent as to cause such rollers to contact uniformly with the material at approximately their mid portions. It will be apparent that the material at this time is non-circular to the extent determined by the spacing of the adjacent edges as controlled by the edge guiding rollers 16, and as determined by the normal manufacturing imperfections of the preforming means used.

Surrounding a portion of the torpedo extension there may be a guide tube 18 preferably provided at its opposite ends with a main guiding conical surface 19 and a cooperating stiffening and supporting member 20 of the same general shape. These parts, which are herein illustrated as comprising the frustra of cones joined at their smaller bases, provide efficient means for guiding the leading and trailing ends of the material. The guide tube 18 is provided with guiding rollers 21 generally similar to the guiding rollers 17 carried by the torpedo extension, which may be offset from true radial lines for the reason before given. The spacing of the rollers 17 and 21 is such as to provide a space therebetween for the passage of the preformed material, the radial distance of the rollers from the center of the torpedo being varied to the extent required by any gradual closing of the distance between the edges of the material as the tube is closed in. As illustrated more particularly in Figure 6 of the drawings the outer guide tube 18 is provided at spaced points along its length with bearing brackets 22 by means of which the guide tube may be rigidly bolted to the center plate 11 and thereby maintained in the desired relationship to the center plate and to the torpedo 12. Such an outer guide tube is effective where provided for holding the edges of the material against the edge guiding rollers 16 irrespective of whether the forming means was able to hold the seam width down to such a value as would insure contact of both edges with such edge guiding rollers, or not.

The edge pre-treating operation before referred to, and which is preferably of a roller leveling type, is conveniently performed while the material is confined between the torpedo and the outer guide tube. To this end the torpedo is provided on opposite sides of the center plate 11 with a series of pairs of edge treating rolls 23, 24, 25, 26 and 27, illustrated respectively in Figures 7 to 11, both inclusive. Cooperating with the pairs of inner rollers just described are pairs of outer rollers 28, 29, 30, 31 and 32, illustrated in the respective figures just referred to. The purpose of these rollers is to cooperate more particularly with the edge portions of the material and alternately deflect the same in opposite directions but in gradually decreasing amounts, similar to the ordinary roller leveling operation and thereby effectively straighten the same.

By reference to the figures just referred to, it will be noted that each leveling roller is formed with a main body or vise portion substantially conforming to the general contour of the preformed material. The edge portions 33 and 34 respectively of the rollers 23 and 28 are such as to bend the edges of the material upwardly to such an extent preferably that the elastic limit of the material is exceeded and a permanent set given to the edge portions, the extent of bending for this reason preferably being greater than any previous bending operation in the same direction to which such edge portions may have been subjected during the previous steps of forming. In like manner, the edge portions 35 and 36 of the rollers 24 and 29 are so shaped as to bend the edge portions in the opposite direction and preferably impart a set thereto. The edge portions 37 and 38 of the rollers 25 and 30 respectively again produce an upward bending of the edge portions but preferably to a less extent than that imparted by the rollers 23 and 28, while the edge portions 39 and 40 of the rollers 26 and 31 impart a bending inwardly of the edge portions of the material to an extent less than that imparted by the rollers 24 and 29. The edge portions 41 and 42 of the final rollers 27 and 32 are such as to bend the material at its edge portions into exactly the position desired for the performance thereon of the subsequent operations incident to heating and welding.

In Figure 7 the preferred construction and mounting of the edge leveling rollers 23 and 28 is illustrated in detail. From this figure it will be noted that the roller 23 is provided with a ball race 43 cooperating with balls 44 held in cooperative relation to the race 43 by a second race 45, the complete assembly constituting an anti-friction mounting for the roller. The mountings for the respective rollers 23 cooperate with bearing portions 46 of a shaft 47 having a projecting flange 48 abutting against one side of the center plate 11 within the torpedo 12. Adjacent the flange 48 is a threaded hub 49 receiving an internally threaded collar 50 by means of which the complete shaft is clamped in position relative to the center plate. The center plate may be provided with eccentric bearing rings 51 by means of which the initial setting of the shaft 47 may be varied. For effecting subsequent minor adjustments of the rollers inwardly or outwardly as may be desired, the bearing portions 46 are in eccentric relationship to the axes of the shaft. The other inner edge leveling rollers are similarly mounted.

The outer pairs of rollers are also similarly mounted, and parts corresponding to the parts just described are designated by the same reference characters having a prime (') affixed thereto. For preventing foreign material from entering the anti-friction bearings, the mountings may be provided with suitable packing, conveniently in the form of felt rings or washers 52. In view of the construction of the outer edge leveling rollers, the outer packing 52 is replaced by means of caps 53 secured in dust tight relation to the rollers.

Figure 13:
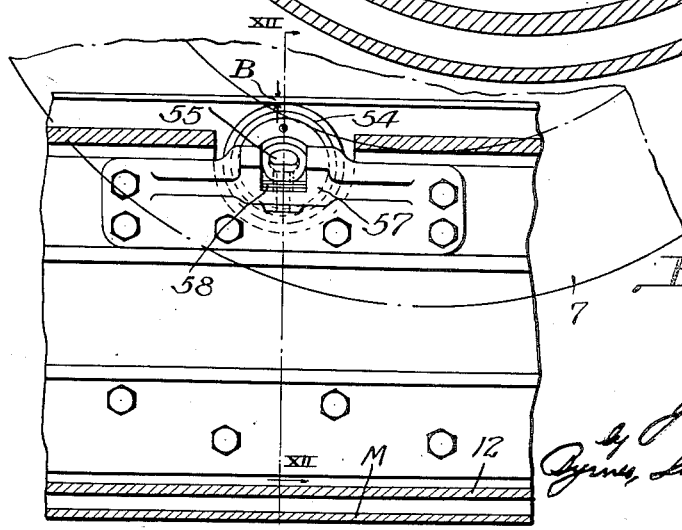
Figure 13 is a view, partly in side elevation and partly in section, of the deflecting means illustrated in Figure 12.
Figure 14:
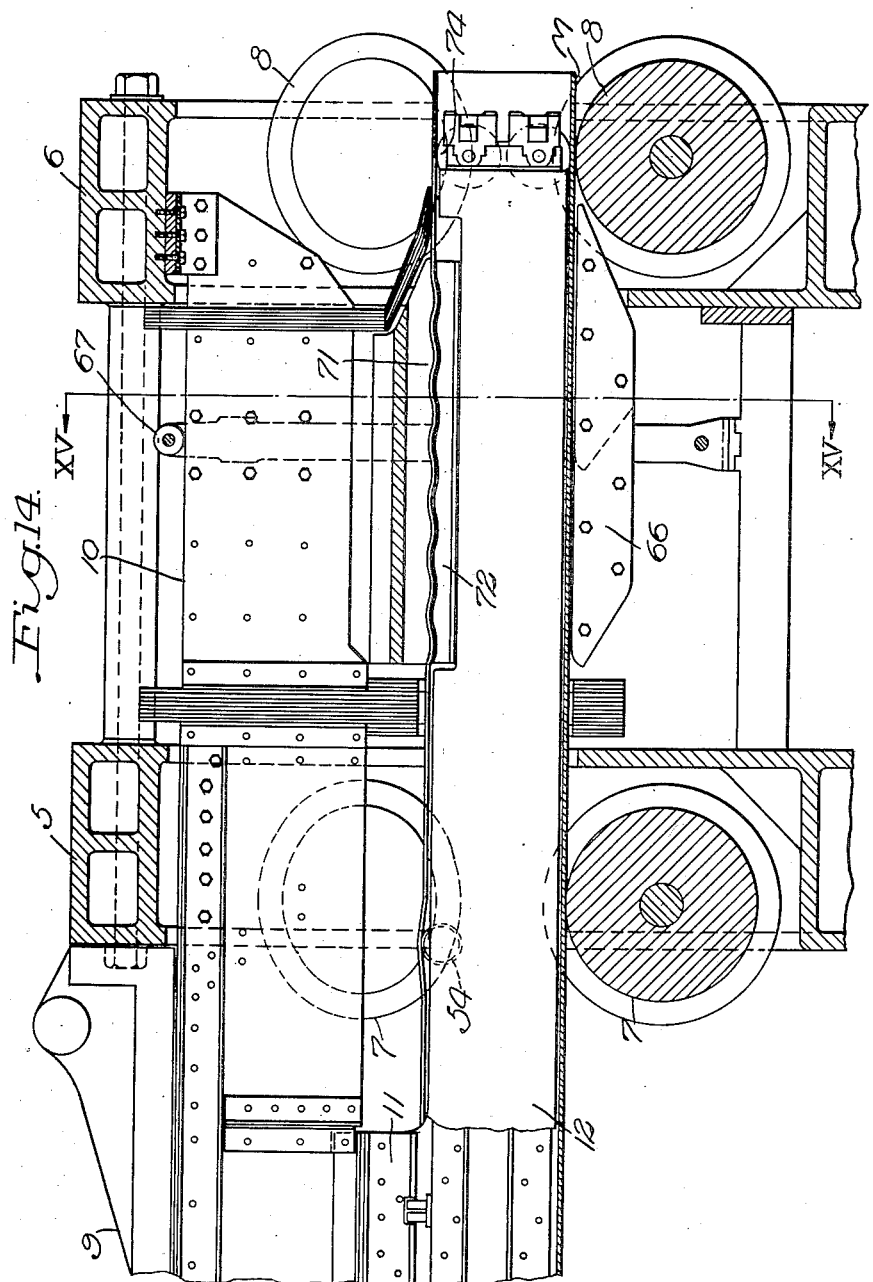
Figure 14 is a side elevational view of the edge weaving mechanism illustrated in Figures 1 and 3.

After having been subjected to the action of the edge leveling rollers, the material with the edges in the desired relationship for the performance thereon of the subsequent operations incident to welding, continues to travel over the torpedo 12, the edge guiding rollers 15 maintaining the material in the proper position. Carried by the apparatus at a point slightly in advance of the crushing frame 5 is a push up roller 54 illustrated in detail in Figures 12 and 13. As illustrated in these figures, the roller 54 is carried by shaft 55 through the medium of a suitable anti-friction bearing 56. The shaft 55 is preferably adjustably supported on bearings 57 whereby its radial distance inwardly or outwardly with respect to the axis of the material may be varied. For accomplishing such an adjustment I have illustrated the shaft as carried by shims 58 which may be removed or added to at the will of the operator for correspondingly changing the position of the roller. As clearly indicated in Figure 12 the roller is preferably substantially symmetrically positioned with respect to the edges of the material so as to directly and uniformly cooperate therewith. In case of an upper seam, which is the type herein illustrated, the periphery of the push up roller is so disposed as to subject the edges of the material to an upward bending, the approximate amount of this bending being indicated by the reference letter B, in Figure 13. This upward bending is of such an amount only as to insure engagement of both the edges by the surface of crushing and sizing rolls 7 carried by frame 5 in such position as to directly cooperate therewith, before these free edges are forced into pressure contact with each other.

The continued travel of the material from the crushing rolls causes the same to pass over an inside coil and core assembly 59 illustrated in detail in Figure 3. This assembly conveniently comprises a laminated core 60 of any desired construction terminating in pole pieces 61 and 62. Intermediate the pole pieces the core is provided with a coil or coil sections 63 constituting a primary source of current input for the welding operations. The current supplied to the coil or coil sections will preferably be of the alternating or pulsating type, as understood in the art.

Surrounding the inner assembly 59, and preferably reaching substantially from the zone of the pole piece 61 to that of the inner pole piece 62 is a series of substantially radially disposed peripherally spaced laminated yokes 66 extending substantially the length of the inner coil and core assembly and constituting the return part of the main magnetic flux path.

By those skilled in the art it will be understood that with the construction just described, the material being welded constitutes a movable secondary for the coil or coil sections, such that when the material passes over the properly excited inner coil and core assembly a current flow will be induced in the material substantially circumferentially thereof. Due to the greater resistance to current flow afforded by the seam or minutely spaced edges of the material, the heating effect of the induced current will be concentrated largely adjacent the edge portions of the material and the maximum heat thereby generated in such edge portions. It will be understood that the energy input will be regulated with respect to the thickness and other characteristics of the material being welded, and the speed of travel thereof, so as to produce the desired heating of the edge portions preparatory to the bringing together and welding of these portions.

From an inspection more particularly of Figure 3 of the drawings it will further be apparent that the inner coil and core assembly is in closely adjacent relationship to the material and spaced only a sufficient distance therefrom to afford easy passage of the material thereover. By this construction the air space between the inner coil and core assembly and the material is reduced to a minimum and the magnetic air leakage path correspondingly reduced, thereby compelling by far the greater portion of the flux to travel through the mutual magnetic paths provided for that purpose. Where a single inside coil is utilized, the full energy output of the coil is not realized until it is completely enclosed by the material being welded. Where, however, the coil is divided axially into a plurality of sections, preferably connected in parallel, each section operates effectively when enclosed by the material, even through the material has not traveled to such a point as to enclose the other coil sections.

Figure 15:
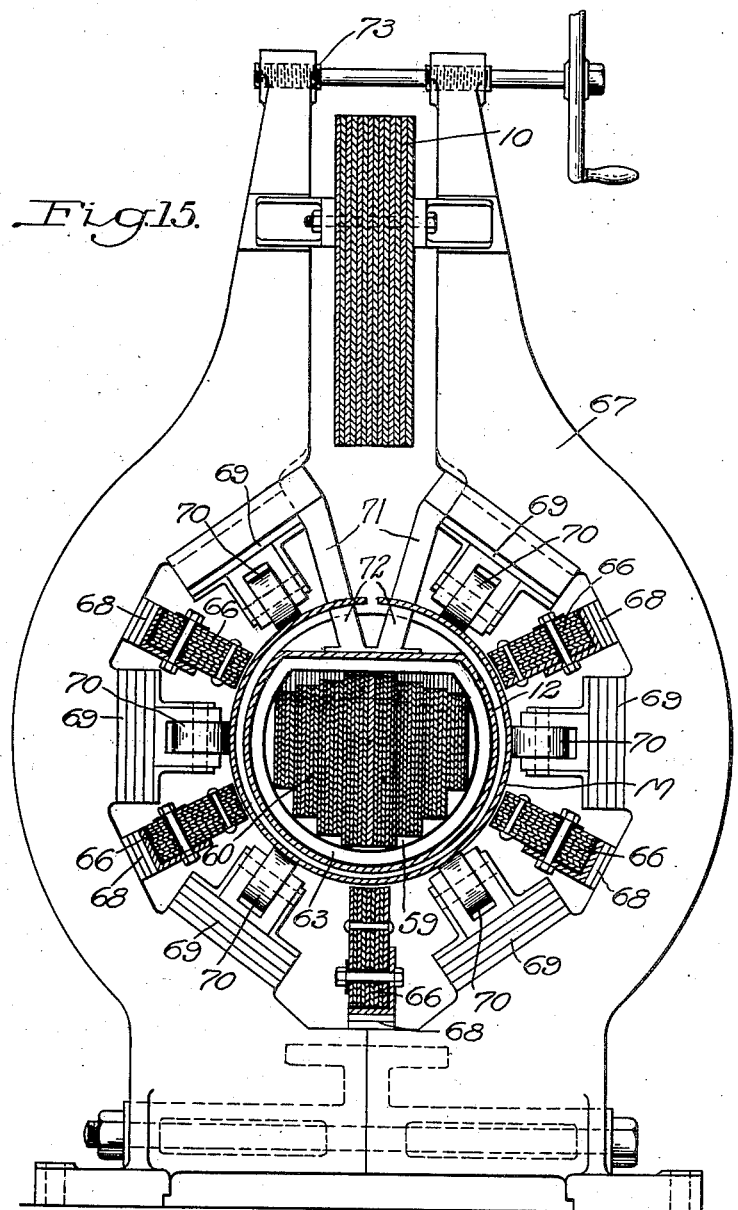
Figure 15 is a cross sectional view on the line XV—XV of Figure 14.

The radial yokes 66 are conveniently carried by means of a pair of intermediate frames 67 hereinafter referred to as flash regulating stands, and illustrated more particularly in Figure 15 of the drawings. From this figure it will be apparent that I have indicated five radial yokes 66 each supported on the flash regulating stands 67 by means of shims 68 whereby the radial position of the yokes may be varied to correspond with the major size to size variations in the diameter of the material being welded. Also carried by the flash regulating stands 67, preferably through the medium of shims 69, are flash regulating rollers 70, four of such rollers being shown for each of the flash regulating stands.

By the provision of any suitable means (not shown) for the adjustment of the crushing and sizing rolls 7, the amount of crushing and sizing of the material may be varied. In most cases I have found it desirable to effect crushing to such an extent as to not only bring the edges of the material into abutting relationship during its passage through the crushing stand, but also to actually reduce the tube perimeter a definite amount, and to a uniform final value, but in some cases the adjustment of the crushing means may be such as to permit the edges to remain in slightly spaced relationship. Where the former adjustment is employed, the crushing means will define a zone of initial contact between the edges thereby facilitating the formation of a flash between such edges, which flash will continue through a zone the length of which will be determined by the adjustment of the flash regulating rollers 70. Where the second mentioned adjustment is employed, the flash will be initiated and held at a point much nearer the welding rolls 8, the flash from that point traveling rearwardly along the material in continued opposition to the forward travel of the material. In both cases, however, there will be provided a flash zone which will be maintained in space as the material being welded travels through the apparatus. Not only is the longitudinal length of the flash zone controllable to a considerable extent by the flash regulating rollers, but the circumferential length of the flash itself may be correspondingly controlled, since the flash regulating rollers will determine the distance between, or amount of separation of, the edges of the material.

While the effect of the edge leveling operation before described, and all the subsequent deflection and return movements of the edges, as well as all of the accurate guiding of the tubes are such as to practically insure the desired continuing and uniform relationship therebetween and promote steady electrical heating, I have found that in some cases due either to characteristics of the material, i. e., different metallurgical compositions, or due to remanent mechanical defects in the characteristics of the edges, such as imperfect alignment, or angularity of shearing, the flash will have a tendency to effect inclined or other unevenness in burning off of the edges. In order to compensate for such a tendency and obviate the same as far as possible, I preferably provide the apparatus with means for effecting such a relative weaving or in and out movement of the edges within the flash zone as to insure a substantially square burning away thereof. In case of tubular material the desired burning should be substantially radially of the material. In the embodiment of the invention illustrated more particularly in Figures 1, 3, 14, 15 and 16 of the drawings this operation is obtained by the provision of a pair of outer edge weaving guides 71 cooperating with a series of inner edge weaving shoes 72 on the inner coil and core assembly. The construction of the guides and shoes is such as to cause at least one of the edges to travel in a sinuous path, or where used with both edges to cause the same to travel in sinuous paths, with the synclinal and anticlinal portions of the opposed edges in offset relationship.

In accordance with the preferred embodiment of the invention as illustrated diagrammatically in Figure 16, this relationship is such that a syncline in one edge lies directly opposite an anticline in the opposite edge. By thus subjecting the material to a succession of sinuous flexures of the character referred to, the edges are caused to cross and recross each other in succession, or weave in and out alternately thereby insuring a square burning off of the edges. It will be understood that the construction of the shoes and guides may be such as to cause a movement of the edges in opposite directions greater than the thickness of the material whereby a complete passing or crossing of the edges is effected, or, as is usually the case it may be such as to afford only a partial passing or crossing of the edges. In either case, successive portions of the edges are subjected to successive flexing or weaving operations such as to prevent any tendency to burn off unevenly. Correspondingly, the flash zone will either be characterized by a continuous flash, or an intermittent flash throughout its length, depending upon the amplitude of the sinuous deflections imparted thereto, it being possible to maintain the flash only at the points where the edge faces oppose each other no matter what their angular relationship.

While the inner coil and core assembly 59 may be so designed as to accommodate the incorporation therewith of the inner guide shoes 72, I preferably utilize an inner assembly characterized by a coil or coil sections having either a substantially flattened portion, or disposed in eccentric relationship to the axis of the material. In either case a comparatively greater space will be provided intermediate the coil and core assembly and the material adjacent the proposed line of weld than would be afforded by a truly circular coil and core assembly concentric with the axis of the material. The greater space afforded under the seam by a construction of the character just described, not only assists in protecting the inner assembly from the intense heat adjacent the seam, but provides sufficient room for the inner guide shoes.

In addition to the shims 68 and 70 by means of which the yokes 66 and the flash regulating rollers 67 may be individually adjusted, I have illustrated the flash regulating stands as provided with adjusting means 73 conveniently in the form of right and left handed screw threaded shafts by means of which the opposed halves of the regulating stands may be moved toward or away from each other to some extent to thereby afford further means for adjustment of the parts carried thereby.

I have herein before referred exclusively to an inside coil and core assembly. Such an assembly is desirable in all cases where it may be practically utilized for the reason that it creates a magnetic repulsion between the coil and core assembly and the material. This outward repulsion is desirable for two reasons. During the flash heating operation it tends to force outwardly the molten and gaseous particles whereby the edges are freed from undesirable matter which might subsequently be incorporated in the seam. In the second place it cooperates with the inner guide shoes in obtaining the desired outward weaving movement of the edges thereby making it possible, and particularly with lighter gauges of metal, to utilize a comparatively simple and compact inside guiding system. With extremely light gauges, the inside guide shoes may possibly be completely dispensed with. This simplifies the construction of the inside coil and core assembly, since obviously it is essential to carry the guide shoes entirely by insulating means in order to prevent such shoes, in combination with the inner assembly, from short circuiting the seam. It will be understood, however, that certain advantages of the present invention are obtainable by the use of an inside coil without any steel core, or with a construction in which an outside coil or coil sections are utilized in conjunction with, or independently of, the inside coil or coil sections.

The material having been heated to, or substantially to, a welding temperature by the flash heating operation, has its edges subsequently brought into engagement either by the adjustment of the flash regulating stands or by the action of the welding rolls 8 depending upon the particular adjustment of these parts. If the edges come into contact within the zone defined by position of the coil or current supply means, there is nevertheless further heating occasioned by the so-called resistance method, the length of the resistance heating zone being determined by the adjustment of the apparatus. This adjustment is preferably such that a combination of flash heating and resistance heating is obtained, although this combination of different types of heating is not essential. The material having had its edge portions heated to a welding temperature then enters the pass defined by the welding rolls 8 which force the edges into alignment and tight into engagement with each other, and effect the desired welding thereof.

Customarily, I may provide the inner coil and core assembly with inside rollers 14 effective in opposition to the welding rolls and defining a substantially enclosed seam space within which the metal at or near the welding heat is confined during the actual welding operation. This not only enables the desired pressure to be applied for welding purposes, but enables me also to control the final surface shape of the seam itself.

Not only does an apparatus of the character described insure substantially uniform heating of the edges and uniform burning away thereof, but by reason of the special treating means to which the edges are subjected, any tendency of the same to slide over each other during the heating and welding operations is prevented, and the edges brought squarely into an abutting engagement, and so held, thereby insuring the formation of a seam extending approximately radially of the material without any overlap of the edges.

Figure 18:
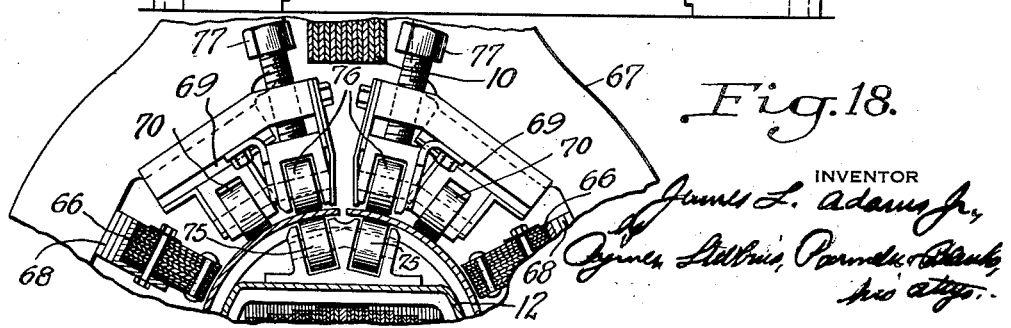
Figure 18 is a partial sectional view along the line XVIII—XVIII of Figure 17.

In Figures 17, 18 and 19 of the drawings I have illustrated a slightly modified embodiment of the invention with respect particularly to the means for obtaining the edge weaving operation previously described. In these figures I have illustrated a series of inside rollers 75 in place of the guide shoes 72, and a series of outside rollers 76 in place of the outside guides 71. By the provision of suitable adjusting means 77 for these rollers, the extent to which the edge weaving is carried on may be varied without necessitating a complete replacement of the rollers such as would be necessary with the guides and guide shoes.

In Figure 19 I have illustrated diagrammatically the relationship of the edges of the material under the influence of the rollers 75 and 76. In this diagram the relationship of these rollers is such as to produce a complete passing or crossing of the edges whereby a succession of localized flash zones FZ are provided as distinguished from a continuous flash throughout the complete length of the flash zone, although in actual practice there will preferably be only a partial passing or crossing effected.

The present invention provides a welding apparatus and a method characterized by the provision of a series of means cooperating to produce not only a more perfect weld, but a more definitely controlled and positioned weld by reason of the edge treating operations to which the material is subjected. These edge treatments, with their attendant results, constitute some of the advantages of the present invention.

Other advantages of the invention arise from the provision of means for preforming the material and for welding the preformed material, characterized by the provision of supplemental or additional forming means cooperating particularly with the edge portions of the material whereby material preformed as accurately as commercially possible during the original forming up operation, is subsequently treated in such manner as to insure not only symmetrical relationship of the edges, but an accurate positioning thereof while in the crushing, heating and welding zones.

Further advantages of the invention arise not only from the edge leveling operation to which the material is subjected, but from the subsequent deflection of the leveled edges prior to crushing, and particularly from the weaving or sinuous flexures to which the previously leveled and accurately positioned edges are subjected during the heating up operation.

While I have herein illustrated and described certain preferred embodiments of my invention it will be apparent to those skilled in the art that changes in the construction and operation of the various parts, as well as in the method of carrying out my invention, may be made without departing either from the spirit of the invention or the scope thereof as defined in my broader claims.

I claim:

1. In a welding apparatus including means for effecting a feeding movement of substantially tubular preformed material in a direction approximately parallel to the axis of the material, heating means producing a flash heating zone for heating the edge portions of the substantially tubular material, and means effective on the edge portions of the material for imparting a succession of angular movements thereto in a direction substantially normal to the direction of feeding movement.

2. In a welding apparatus including means for effecting a feeding movement of substantially tubular preformed material in a direction approximately parallel to the axis of the material, heating means producing a flash heating zone for heating the edge portions of the substantially tubular material, and means effective on the edge portions of the material for imparting a succession of angular movements thereto in a direction substantially normal to the direction of feeding movement, said last mentioned means being operative for producing an outward movement of one of the edges substantially concomitantly with an inward movement of the opposite edge.

3. The combination with welding means effective for welding substantially tubular preformed material, of means for imparting a substantially permanent set to an edge portion of the preformed material for predeterminately positioning the same, and means subsequently effective on an edge portion of the material for producing an angular movement thereof in a direction substantially normal to the longitudinal axis of the material.

4. In a welding apparatus, sizing means, means effective on one side of the sizing means for effecting an edge leveling operation on the material to be welded, and a means effective on the opposite side of the sizing means for causing the edge portions to assume an angular substantially intersecting relationship one to the other.

5. In a continuous plate seam welder, the combination with progressive plate feeding and welding means, of a plurality of pressure means effective for alternately weaving the opposed edges to be welded in out-of-phase relation one to the other and transversely to the plane of the plate.

6. In a continuous plate seam welder, the combination with welding and material feeding means effective in a direction longitudinally of the seam, of transverse pressure applying means effective for imparting progressively at least one minor sinuous flexure to each heating edge during the heating up period, said transverse pressure applying means being arranged to flex the edges in staggered relation one to the other.

7. In a continuous tube welder, the combination with welding means including means for progressively feeding substantially tubular preformed material in a direction generally longitudinally of the seam to be welded, of pressure means for deflecting one of the edges of said seam progressively through a slightly sinusoidal path normal to the plane of the seam material but longitudinally in line with said seam to tend to induce a square burn off of both seam edges.

8. In a continuous electric tube welder, the combination with roller means effecting a progressive feeding movement of substantially tubular preformed metal in a direction approximately parallel to a seam therein, of electrical heating means effective for producing a flash heating of the edge portions of the material, and radially acting progressive edge weaving means effective in the flash heating zone for insuring a substantially radial burning off of the tube edges.

9. In a continuous electric tube welder, the combination with roll means for progressively feeding substantially tubular preformed metal in a direction approximately parallel to the seam to be welded, of multi-roll means for progressively imparting a substantially straight line set to at least one of the seam edges to be welded, and means subsequently effective thereon for producing progressively at least one radial flexure to induce substantially radial burn off of the opposed edge faces of the seam.

10. In a continuous tube welding apparatus, the combination with power driven tube crushing and feeding means effective to reduce an open seam preformed tube to substantially circular form and a predetermined size, of means for pressure welding the longitudinal seam edges of the sized tube, and guide means intermediate the crushing and welding means operative on the said seam edges to progressively effect sinusoidal flexure thereof during heating in a plane transverse both to the seam and to the material of the tube at the seam position.

11. In a welding apparatus, the combination with means for advancing plate edges in slightly spaced relation, of means including a plurality of rolls for alternately deflecting the material adjacent said edges in opposite directions from the normal position thereof.

12. In a welding apparatus, the combination with means for advancing aligned plate edges in slightly spaced relation, of means including staggered rolls for imparting successive sinuous flexures to the advancing edges.

13. The combination defined in claim 12 wherein the edge flexing means is effective in opposite directions on the edges respectively.

14. In a metal working apparatus, means for advancing metallic plate edges in opposed and slightly spaced relation, and means including rolls on opposite sides of the plate effective for continuously deflecting the metal adjacent one of said edges in opposite directions from the original position thereof.

15. In an apparatus for welding abutting edges of a plate formed into a tube blank having an axial seam cleft, means for advancing the tube plate with its edges in opposed but slightly spaced relation, and means including rolls engaging at least one of said edges and effective continuously to bend it successively in opposite directions from its original position.

16. In a metal working apparatus, the combination with means for advancing metallic plate edges in opposed, spaced relation, of a plurality of staggered rolls for engaging one of said edges and effective continuously to successively deflect the edge in opposite directions from its initial position.

17. In a welding apparatus, means for advancing metallic plate edges in opposed, spaced relation, means for progressively heating said edges substantially to welding temperature, and means including rolls engaging at least one of said heated edges, said rolls being effective to deflect the edge engaged thereby continuously in successively opposite directions from its initial position.

18. The combination set forth in claim 17, characterized by the fact that edge deflecting means are provided for both said edges, said edge deflecting means being effective for bending said edges, respectively, in opposite directions instantaneously.

19. In a method of welding, the steps including advancing metallic plate edges in opposed spaced relation, progressively heating said edges, and continuously deflecting successive portions of at least one of said heated edges successively in opposite directions.

20. In a method of welding together the edges of a plate bent to form a tube blank having an axial seam cleft, the steps including inducing from within the blank an electric heating current circumferentially thereof and passing across the seam cleft, deflecting successive portions of the edges in opposite directions and engaging the blank at a plurality of points on the exterior periphery of the blank for opposing the repulsive effect of said current tending to open up the formed blank.

21. In a method of welding together the edges of a plate bent to form a tube blank with an axial seam, the steps including inducing an electric heating current circumferentially of the blank and passing across the seam cleft, and continuously bending successive portions of at least one of said edges radially in opposite directions from its initial position.

22. In a welding apparatus, means for advancing plate edges in opposed spaced relation, means for progressively heating said edges, means for deflecting successive portions of at least one of said edges successively in opposite directions from its initial position, and means for subsequently aligning said edges into substantially co-planar relation.

23. Apparatus for welding, comprising means for advancing metallic plate edges in opposed spaced relation, and means for initially aligning said edges into substantially co-planar relation, means for heating said edges, and means for continuously deflecting successive portions of at least one of the heated edges successively in opposite directions from its initial position.

24. Apparatus for welding together the edges of a plate bent to form a tubular blank, comprising means for advancing the blank in an axial direction, interior and exterior guide means engaging the blank peripherally, means for heating said edges, and means for continuously deflecting successive portions of at least one of said edges successively in opposite directions from its initial position.

25. The apparatus defined by claim 11, wherein said rolls are so arranged and constructed as to deflect said edges out of phase with each other whereby to cause a square burn-off of said edges, and accurate alinement thereof preparatory to welding.

26. The method defined by claim 19, wherein the successive portions of the edges are deflected in opposite directions and out of phase, causing a square burn-off of said edges and accurate alinement thereof preparatory to welding.

JAMES L. ADAMS, Jr.